United States Patent [19]

Satoji

[11] Patent Number: 4,687,696

[45] Date of Patent: Aug. 18, 1987

[54] FINGER STRIPS FOR COPYING MACHINES

[75] Inventor: Fuminori Satoji, Kuwana, Japan

[73] Assignee: NTN-Rulon Industries Co., Ltd., Tokyo, Japan

[21] Appl. No.: 759,971

[22] Filed: Jul. 29, 1985

[30] Foreign Application Priority Data

Apr. 12, 1985 [JP] Japan .................................. 60-78699

[51] Int. Cl.[4] .............................................. B32B 23/02

[52] U.S. Cl. .................................... 428/192; 428/336; 428/419; 428/421; 428/473.5; 428/474.4; 428/523; 528/401

[58] Field of Search ............ 428/421, 192, 336, 473.5, 428/474.4, 419, 523; 528/401

[56] References Cited

U.S. PATENT DOCUMENTS

| | | | |
|---|---|---|---|
| 3,733,349 | 5/1973 | Loudas et al. | 528/401 |
| 4,238,602 | 12/1980 | Griffen | 528/401 |
| 4,451,646 | 5/1984 | Sianesi et al. | 528/401 |
| 4,487,668 | 12/1984 | England et al. | 428/421 |

*Primary Examiner*—George F. Lesmes
*Assistant Examiner*—P. R. Schwartz
*Attorney, Agent, or Firm*—Armstrong, Nikaido, Marmelstein & Kubovcik

[57] ABSTRACT

Improvements in a finger strip for copying machines are proposed. The finger strip made of a heat-resistant resin is coated with a fluorinated polyether polymer to improve lubricity and antistickiness. High adhesion strength between the coating and the substrate and very thin coating help to eliminate the problems of poor separation and jamming of paper.

5 Claims, No Drawings

FINGER STRIPS FOR COPYING MACHINES

The present invention relates to finger strips for a copying machine.

With dry type copying machines, which have made a rapid progress with information orientedness of the society, the electrostatic latent image formed on the surface of a photosensitive drum corresponding to the characters, figures, etc. of an original is transformed to toner images, which are transferred onto paper fed from a paper feed cassette. The surface of paper is heated under pressure by a heated fixing roller to fix the toner image on the paper fiber so as not to be easily separated. In the last fixing process on such a machine there is a high risk of the paper heated under pressure by the fixing roller sticking to the roller to cause jamming. It is, therefore, essential to provide finger strips with their tip pressed against the fixing roller to lift the paper's edge for smooth separation off the roller. Naturally, the finger strips should be made of a heat-resistant material for their tip to be free from deformation. Their tip also must have a small radius of curvature (hereinafter referred to as "tip's R") (e.g. less than 0.1 mm or preferably less than 0.05 mm) and have lubricity to prevent poor separation and jamming at the finger strips. Further, because the temperature of the surface of the fixing roller rises to 170°-270° C., it is possible that the toner stuck to the paper welds on the finger strips to cause jamming, or the toner fixed on the paper is scraped by the finger strips to form whity streaks (hereinafter referred to as "finger mark"). In order to avoid such troubles, the finger strips are required to be antisticky to the toner.

To meet the above-mentioned requirements, it has been hitherto proposed to make the finger strips of such resins as polyimide, polyamide-imide, polyarylene sulfide, aromatic polyether ketone, aromatic polysulfone, aromatic polyether imide, aromatic polyamide, aromatic polyester or these resins mixed with a fluorine resin such as polytetrafluoroethylene resin or a solid lubricating agent such as graphite, or these resins coated with a fluorine-containing polymer to improve lubricity and antistickiness, as disclosed in Japanese Utility Model Publication No. 54-18921 and Japanese Laid-Open Patent Application No. 57-111569. With finger strips with their surface not covered with a fluorine-containing polymer, problems such as jamming or finger mark are not solved, even if they contain a fluorine resin or a solid lubricating agent. Even with finger strips with their surface coated with a fluorine-containing polymer, the desired lubricity and antistickiness could not be attained sufficiently. After continuous use for a prolonged period, jamming or finger mark can occur, depending on the kind of a toner. Generally, in order to exhibit the desired lubricity and antistickiness, the thickness of the coating is required to be 30 μm on the average and at least more than 10 μm. The coating increases the tip's R, causing poor separation, jamming, etc.

Therefore, taking the thickness of the coating into consideration, the finger's tip R is sometimes made smaller beforehand at the time of molding. However, the finger's tip would become more subject to heat distortion. So this decreases the temperature at which the fingers can be used. Also, since the finger's substrate made of a synthetic resin is not bonded securely to the fluorine-containing polymer, separation of the coating at interface is likely to occur. Another problem is that because the film of fluorine-containing polymer is formed usually by spraying a dispersion of fluorine-containing polymer in a polar solvent medium to a thickness of 20-40 μm, most of the dispersion is wasted. This results in low product yield and extremely high manufacturing cost. Although an attempt is also made for forming a film of silicone oil on the surface of the finger strips e.g. by dipping so as to attain the desired lubricity and antistickiness, the film so formed can easily come off the finger's surface. Its effect cannot be maintained.

An object of the present invention is to provide a finger strip for copying machines which obviates the abovesaid shortcomings.

In accordance with the present invention, at least the tip portion of finger strips is coated with a fluorinated polyether polymer having $$—C_{X1}F_{2X1}—O—$$

(wherein $X_1$ is an integer 1 2, 3 or 4) as its main structural unit and having its ends linked with at least one polar group.

The fluorinated polyether polymer used in this invention has a good lubricity and antistickiness for itself and is capable of forming a film as thin as a monomolecular film. Hence, when it is used to coat the finger strips, their tip portion exhibits good lubricity and antistickiness without increasing the tip's R.

The term heat-resistant resin used in the present invention means a synthetic resin whose mechanical strength allows a continuous use as paper finger strips at a temperature of higher than 150° C. Such resins include Amoco Inc. (USA)'s aromatic polyamide-imide resin sold under the name TORLON (trademark), DuPont (USA)'s polyimido resin sold under the name VESPEL-SP (trademark), Phillips (USA)'s polyphenylene sulfide resin sold under the name RYTON (trademark), I.C.I. (England)'s polyether ether ketone resin sold under the name Udel-PEEK (trademark), I.C.I. (England)'s polyether sulfone resin sold under the name Udel-PES (trademark), General Electric Inc. (USA)'s polyether imide resin sold under the name ULTEM (trademark) and Carborumdum (USA)'s aromatic polyester resin sold under the name EKONOL (trademark).

Fluorinated polyether polymers having at least one polar end group used in the present invention have as their principal structural unit, $—C_{X1}F_{2X1}—O—$(wherein $X_1$ is an integer 1-4) and have a number-average molecular weight of 1,000-5,000. To mention several examples, $OCN—C_6H_3\ (CH_3)—HNCOCF_2—(C_2F_4O)_m—(CF_2O)_n—CF_2CONH—(CH_3)C_6H_3—NCO$, $CH_3OOC—CF_2O—(C_2F_4O)_m—(CF_2O)_n—CF_2COOCH_3$, $HOCH_2—CF_2O—(C_2F_4O)_m—(CF_2O)_n—CF_2—CH_2OH$, $HO—(CH_2)_2—NHCO—CF_2O—(C_2F_4O)_m—(CF_2O)_n—CF_2CONH—(CH_2)_2—OH$, $$CF_3—O—(CF_2—CF(CF_3)—O)_n—CF_2—C(=O)—CF_3,$$

$$F(CF(CF_3)—CF_2—O)_n—CF(CF_3)—COOCH_3.$$

(wherein m and n are integers of sufficient magnitude to obtain the average molecular weight of 1000 to 5000.)

Among them, the first to third are preferable. The first one is manufactured by Montejison in Italy and known under trademark "Fomblin Z-DISOC". The second one is manufactured by the same company and known under trademark "Fomblin Z-DEAL". The third one is manufactured by the same company and known under trademark "Fomblin Z-DOL". All of these three have an average molecular weight of about 2000.

For forming a thin film of fluorinated polyether polymer on the surface of finger strips to impart lubricity and antistickiness thereto, the abovementioned fluorinated polyether polymer have too high a viscosity. For example, the viscosity at 20° C. of Fomblin Z-DOL 2000 is approx. 80 cst and that of Fomblin Z-DEAL 2000 is approx. 20 cst. It is, therefore, advisable to dissolve the fluorinated polyether polymer in a highly fluorinated organic solvent such as Freon 113 and coat it e.g. by spraying or dipping. The latter is preferable because of higher yield. There is no particular limit with regard to the concentration of fluorinated polyether polymer dissolved in a highly fluorinated organic solvent, but, in view of the cost, 0.3–10 weight % is preferable and for better effect, 0.5–3 weight % is particularly preferable. After coating and drying, the surface, which is slightly clouded, should be polished with soft cloth or tissue paper until it becomes glossy. This is in order to remove any excessive fluorinated polyether polymer. Since the film formed on the surface of finger is extremely thin, it is difficult to measure its thickness. Since the monomolecular layer of fluorinated polyether polymer formed according to the present invention is supposed to be approx. 40 angstroms thick, the thickness of film is supposed to be not more than 1 μm. When it is thicker, it means that the film contains excessive fluorinated polyether and that the film contains a large amount of free reactive end groups not bonded to the substrate resin. This adversely affects the lubricity and antistickiness required for the finger strips.

The substrate resin of the finger strips is coated by dipping in a solution of fluorinated polyether polymer in a highly fluorinated organic solvent and then drying at a suitable temperature e.g. in a drying furnace with a hotair temperature of 50° C. to vaporize the highly fluorinated organic solvent. It may be treated after drying at a still higher temperature to enhance the reactivity between the substrate resin and the polar end groups of fluorinated polyether polymer. For instance, aromatic polyamide-imide resin manufactured by Amoco in USA and known under the trademark TORLON is injection molded into the shape of a finger strip, the surface of which is then coated by dipping in a solution of fluorinated polyether polymer, the film formed being then treated at a high temperature of 250°–270° C. for a proper time. High temperature means the temperature at which there is no possibility of either heat distortion or decomposition of the substrate resin and fluorinated polyether.

In the Examples and Control Examples given below, the contents of materials are all indicated in terms of weight %.

EXAMPLE 1–3

10% of graphite, 30% of polyether-imide resin (General Electric Inc.'s ULTEM 1000) and 60% of polyamide-imide resin (Amoco Inc. TORLON 4000T) were mixed in a Henschel mixer. The mixture was kneaded and extruded by a twin-screw melt extruder and the extruded strand was then cut into pellets. These pellets were injection molded into the shape of finger strips. As a fluorinated polyether polymer, the below-mentioned three products of Montejison (Italy) were used (all have a number-average molecular weight of 2000). In Example 1, Fomblin Z-DISOC was used. In Example 2, Fomblin Z-DEAL was used. In Example 3, Fomblin Z-DOL was used. Each test piece (finger strip) was dipped in a 1.5% solution in Freon 113, then dried and heat treated at 260° C. for 24 hours, and then evaluated for lubricity, antistickiness and performance as the finger strip in the following manner.

Lubricity:

They were tested with a thrust type rubbing tester against the surface of bearing steel (SUJ 2) at a load of 1 kg/cm$^2$ and at a speed of 1 cm/second.

Antistickiness:

The contact angles against water and acetic acid were measured for each test piece by the use of a goniometer-type contact angle tester (made by Elmar Kogaku).

Performance as finger strip:

The test was carried out by the use of Sharp Corporation's dry-type copying machine Model Z-60, with the test pieces identical in shape to the finger strips mounted in position. 50,000 sheets of A-4 size paper were continuously passed through machine for copying. The results were checked for the number of sheets copyed until poor separation (or jamming) firstly occurred, for the presence of toner image stained with the finger mark, and for the quantity of toner adhering to the test piece [no or traces of adhesion (◎ ), slight amount of adhesion (o), more amount of adhesion (Δ) and marked adhesion (X)]. After the copying test the toner deposited on each finger strip was wiped off with ethyl alcohol and then the contact angles against water and acetic acid were measured again. The results are shown in Table 1.

TABLE 1

| | | Example 1 | Example 2 | Example 3 | Control Example 1 |
|---|---|---|---|---|---|
| Rubbing coeff. | | 0.11 | 0.10 | 0.11 | 0.32 |
| Contact angle (before test) | Water | 105–115 | 103–110 | 104–112 | 75–80 |
| | Acetic acid | 35–42 | 37–44 | 40–46 | 8–12 |
| Poor separation | | No | No | No | 1820 |
| Finger mark | | No | No | No | Yes |
| Toner deposition | | ◎ | ◎ | ◎ | x |
| Contact angle (after test) | Water | 105–112 | 100–107 | 104–112 | 72–78 |
| | Acetic acid | 32–40 | 35–44 | 38–43 | 8–12 |

CONTROL EXAMPLE 1

Control test piece was prepared in exactly the same way as in Example 1 except that it was not coated with fluorinated polyether polymer. Measurement was taken also in the same way. The results are shown in Table 1.

As seen from Table 1, the finger strips in Examples 1–3 had excellent lubricity and good contact angles (and thus good antistickiness) comparable to fluorine plastic, and showed satisfactory performance as the finger strips. After the copying test the contact angle was large as before the test, and was considerably different from the contact angle measured on Control Example 1. This means that the surface of the finger strips in Examples 1–3 is still covered with the fluorinated polyether polymer film even after the test and that the fluorinated polyether polymer coating in the present invention has an excellent adhesion strength and wear resistance.

EXAMPLE 4–9

As the heat-resistant resin for the finger strip, Amoco Inc.'s aromatic polyamide-imide resin Torlon 4203 (containing 3% titanium dioxide and 0.5% ethylene tetrafluoride was used in Example 4, and Amoco's aromatic polyamide resin Torlon 4301 (containing 12% graphite and 3% polytetrafluoroethylene) was used in Example 5. Asahi Glass Co. (Japan)'s polyphenylene sulfide resin RE 101 JA (containing inorganic filler) was used in Example 6. Asahi Glass Co.'s another polyphenylene sulfide resin RFG 1,530 JA (containing 15% polytetrafluoroethylene and 30% glass fiber) was used in Example 7. I.C.I. (England)'s aromatic polyether ketone resin PEEK-150P admixed by melt blending with 30% of Otsuka Kagaku (Japan)'s potassium titanate whisker Tismo D 101 was used in Example 8. DuPont (USA)'s aromatic polyimide resin Vespel SP-1 was used in Example 9. These test pieces in Examples 4–8 were prepared by injection molding as in Example 1. The molded test pieces were heat treated at 260° C. for 24 hours in Examples 4 and 5. The test piece was cut out of a round bar in Example 9. These test pieces were coated with the same fluorinated polyether in the same way as in Example 1 except that the heat treatment after coating was done in a hotair drying furnace at 50° C. The same tests were made. The results are shown in Table 2.

TABLE 2

| | | Example | | | | | |
|---|---|---|---|---|---|---|---|
| | | 4 | 5 | 6 | 7 | 8 | 9 |
| Rubbing coeff. | | 0.10 | 0.12 | 0.11 | 0.13 | 0.10 | 0.11 |
| Contact angle (Before test) | Water | 104–108 | 105–112 | 97–103 | 95–100 | 100–109 | 100–108 |
| | Acetic acid | 42–47 | 38–45 | 29–34 | 25–30 | 35–39 | 31–40 |
| Poor separation | | No | No | No | No | No | No |
| Finger mark | | No | No | No | No | No | No |
| Toner deposit'n | | ◎ | ◎ | ◎ | o | ◎ | o |
| Contact angle (After test) | Water | 99–105 | 101–107 | 95–100 | 95–99 | 100–105 | 100–104 |
| | Acetic acid | 40–45 | 38–43 | 28–34 | 23–28 | 32–37 | 29–34 |

As seen from Table 2, the finger strips in Examples 4–9 were excellent as in Examples 1–3 in lubricity, antistickiness and performance as finger strip. Judging from the contact angles after the copying test, the adhesion strength and wear resistance were satisfactory, too.

CONTROL EXAMPLES 2–8

In Control Examples 2, 3 and 8, test pieces were made of Torlon 4203 as in Example 4. In Control Example 4, Amoco Inc. (USA)'s aromatic polyamide-imide resin Torlon 4347 (containing 12% graphite and 8% polytetrafluoroethylene resin) was used. In Control Example 5, RE 101 JA was used as in Example 6. In Control Example 6, REG 1530 JA was used as in Example 7. In Control Example 7, a 7:3 (weight ratio) melt blend of PEEK-150P and Tismo D 101 A was used as in Example 8. These resins were injection molded in the same way as in Example 1. In Control Examples 2, 3, 4 and 8, the molded test pieces were heat treated at 260° C. for 24 hours. In Control Examples 3 and 5, each molded test piece was uniformly coated by use of a suck-up type spray gun with Daikin Kogyo (Japan)'s Polyflon Tough Coat Enamel TC 7105 GN and TC-7409 BK to a film thickness of approx. 30 μm. After subsequent drying at 100° C. for 30 minutes, heat treatment was carried out at 250° C. for 30 minutes in Control Example 3 (TC 7105 GN used) and at 180° C. for 30 minutes in Control Example 5 (TC 7409 BK used). In Control Example 8, after heat treatment, the test piece was dipped in a 1.5% solution of Montejison (Italy)'s Fomblin Z-25 (fluorinated polyether polymer having no polar end group with viscosity of 250 cst at 20° C.) in Freon R 113 and then dried at 50° C.

With these control test pieces the same tests were made as in Example 1. The results are shown in Table 3. As clearly seen from Table 3, the test pieces without any coating, i.e. those in Control Examples 2, 4, 6 and 7 were bad in lubricity as well as antistickiness, and no satisfactory results were obtained in the copying test, either. Even if the finger's surface was coated with film, the tip's R increased by the film thickness of 30 μm as in Control Examples 3 and 5, and also poor separation due to insufficient lubricity or finger mark due to insufficient antistickiness, or increased toner deposition were noted. In Control Example 8, the finger strip coated with a thin film of fluorinated polyether polymer was excellent in lubricity and antistickiness before the copying test. However, since the film had no polar end group, the adhesion strength was poor, the coating was peeled off during the copying test and the result was not satisfactory. This is clear from the marked drop in the contact angles after the test.

TABLE 3

| | | Control example | | | | | | |
|---|---|---|---|---|---|---|---|---|
| | | 2 | 3 | 4 | 5 | 6 | 7 | 8 |
| Rubbing coeff. | | 0.33 | 0.16 | 0.24 | 0.20 | 0.25 | 0.29 | 0.10 |
| Contact Angle (Before test) | Water | 70–80 | 95–100 | 80–86 | 85–92 | 79–85 | 73–80 | 105–112 |
| | Acetic acid | 8–12 | 19–25 | 15–22 | 18–23 | 13–21 | 9–13 | 41–45 |
| Poor separation | | 1900 | 9500 | 2550 | 8600 | 4880 | 4260 | 5010 |
| Finger mark | | Yes | Yes | Yes | Yes | Yes | Yes | Yes |
| Toner deposit'n | | x | Δ | x | Δ | x | x | x |
| Contact angle (After test) | Water | 68–77 | 90–95 | 77–82 | 78–84 | 77–81 | 69–77 | 71–76 |
| | Acetic acid | 7–11 | 19–23 | 15–20 | 15–22 | 10–15 | 7–10 | 7–12 |

As is apparent from the above, the finger strips for copying machines of the present invention are excellent in lubricity and antistickiness. Because of good adhesion and thin film, the defects in the conventional method such as increased tip's R, poor separation and jamming can be precluded. They can withstand prolonged continuous use without impairing thermal conductivity and electrical conductivity.

What I claim:

1. A finger strip for separating sheets of paper off a fixing roller on a copying machine, said finger strip being made of a heat-resistant resin and having at least a tip portion coated to a thickness of about 40 angstroms to 1 micron with a fluorinated polyether polymer which has as its main structural unit $$—C_{X1}F_{2X1}—O—$$

wherein $X_1$ is 1, 2, 3 or 4 said polymer having an average molecular wegiht of 1,000 to 5,000, and having its end linked with at least one polar group.

2. A finger strip as claimed in claim 1, wherein the main structural unit of said fluorinated polyether polymer is $$-[(C_2F_4O)_m(CF_2O)_n]-.$$

(wherein m and n are integers of sufficient mangitude to obtain the average molecular weight of 1000 to 5000.)

3. A finger strip as claimed in claim 2, wherein said fluorinated polyether polymer can withstand a temperature of 170°–270° C.

4. A finger strip as claimed in claim 2, wherein said heat-resistant resin is one selected from the group consisting of polyamide-imide resin, polyimide resin, polyphenylene sulfide resin, polyether ether ketone resin, and polyether imide resin.

5. A finger strip as claimed in claim 1, wherein said polar group is an isocyanate group.

* * * * *